May 20, 1969  WILLIAM I. L. WU  3,445,762
FREQUENCY RESPONSE TESTING
Filed March 13, 1963
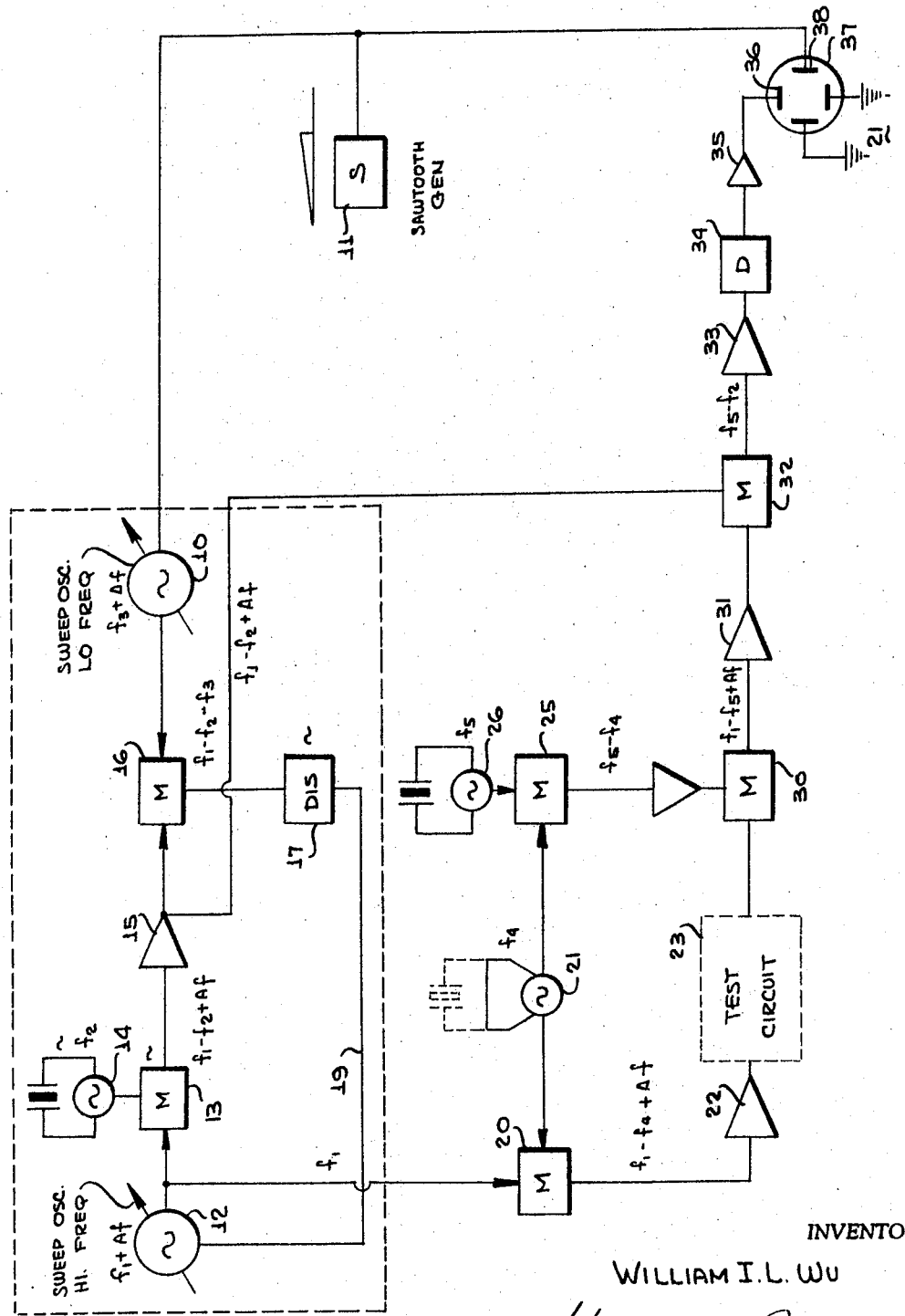
INVENTOR
WILLIAM I. L. WU
BY Hurwitz & Rose
ATTORNEYS

United States Patent Office 3,445,762
Patented May 20, 1969

3,445,762
FREQUENCY RESPONSE TESTING
William I. L. Wu, New Rochelle, N.Y., assignor to The Singer Company, New York, N.Y., a corporation of New Jersey
Filed Mar. 13, 1963, Ser. No. 264,847
Int. Cl. G01r 23/14, 29/22, 27/00
U.S. Cl. 324—57                                9 Claims The present invention relates generally to spectrum analyzers and more particularly to systems for testing the frequency response characteristics of very narrow band circuits such as crystal filters.

The frequency response of a crystal filter may be extremely narrow. To be useful, a measurement of its frequency responses must be extremely accurate and of high resolution. A spectrum analyzer for measuring frequency response of a crystal filter, or the resonances of a piezoelectric crystal, requires a very narrow sweep operating with extreme accuracy, at a fairly high mean frequency value.

In testing the response of any circuit to a sweeping frequency it is required to amplify the response signal for application to a visual indicator. It is then desirable to avoid utilization of a system in which the signal amplifier, which may be non-linearly responsive as a function of frequency, intrudes its own gain frequency characteristic on the frequency characteristic of the system under test. To avoid this consequence, or possibility, one may process the sweeping test frequency as it emerges from the circuit under test, to equal always a single fixed frequency. The processed signal, moreover, may be derived entirely from accurately known non-scanning signals, whereby a visual response can only be obtained if the signal amplifier is correctly tuned. This fact facilitates lining up the selective signal amplifier. The frequency of operation of the amplifier can be selected to be at an advantageous value, in respect to ease of design, and since the amplifier is required to operate only at a single frequency it may be made virtually noise free even at high gain.

It is, accordingly, an object of the invention to provide an amplitude versus frequency characteristic plotter capable of scanning with extreme accuracy over a narrow band, and consequently of testing the frequency response characteristic of piezo-electric crystals, crystal filters, and the like.

It is another object of the invention to provide an amplitude versus frequency characteristic plotter wherein a response signal at an accurately controlled single frequency is generated for all test frequencies.

It is still a further object of the invention to provide a system of amplitude versus frequency plotting wherein a single response signal frequency is generated for all values of test signal frequency, the response signal frequency being derived as the difference of a pair of crystal controlled oscillator frequencies.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a system according to the invention.

Referring now to the drawings, the reference numeral 10 denotes a sweep frequency oscillator having a mean frequency $f3$ and a sweep $\Delta f$, under control of the voltage output of a sawtooth generator 11. The frequency $f3$ is extremely low, say 1 mc. The numerical examples given herein are, however, exemplary only, and not limiting.

A further frequency scanning oscillator 12, operating at high frequency, say 5 mc., is desired to have a sweep $\Delta f$ (say 10 c.p.s.) and to be slaved to the oscillator 10, in respect to both mean frequency and sweep. To this end the output of oscillator 12 is heterodyned in a mixer 13 with the output of a crystal controlled oscillator 14. The difference frequency output of mixer 13, $f1-f2+\Delta f$ is selected by amplifier 15. This frequency is higher than $f3$, and is further heterodyned in a mixer 16 with the output of oscillator 10, providing a frequency $f1-f2-f3+\Delta f$, if the frequency deviations of oscillators 10 and 12 are equal, and a departure $df$ from that value if they are unequal. The output of mixer 16 proceeds to a frequency discriminator 17, tuned to provide zero output for the frequency $f1-f2-f3$, and a DC frequency control voltage of polarity and magnitude determined by the sign and magnitude of $df$. This frequency control voltage is applied via lead 19 to control the frequency of oscillator 12 in such sense as to tend to reduce $df$ to zero. The output of frequency discriminator 17, then, operates as a sweep voltage for oscillator 12, keeping its frequency deviations and mean frequency locked to the frequency of oscillator 10. Since the latter is a low frequency oscillator it is stable in absolute terms, i.e. small percentage instability does not imply large absolute instability. The stability of oscillator 10 then serves to establish the stability of oscillator 12, on an absolute basis, so that the oscillator 12 can sweep accurately and linearly over the narrow range required, i.e. 10 c.p.s. in the example provided, despite its high mean value.

The output of oscillator 12, i.e. $f1+\Delta f$, is heterodyned in a mixer 20 with the output of a crystal oscillator 21, at frequency $f4$, to provide a difference frequency $f1-f4+\Delta f$. The latter frequency is selected by amplifier 22 and applied to a circuit subject to test 23. The latter may be a narrow band circuit, 23, such as a piezo-electric crystal, a crystal filter, a reed or tuning fork filter, or the like.

The output of oscillator 21 is also heterodyned in a mixer 25 with the output of a crystal oscillator 26, at frequency $f5$. The output of mixer 20, i.e. $f1-f4+\Delta f$, as derived from the circuit under test 23, is heterodyned in a mixer 30 with the output of mixer 25, at frequency $f5-f4$. The difference frequency is $f1-f5+\Delta f$, i.e. the frequency $f4$ has disappeared. The frequency $f1-f5+\Delta f$ is selected by amplifier 31, and applied to a heterodyne mixer 32, together with the output of amplifier 15, at $f1-f2+\Delta f$. The difference frequency out of mixer 22 is selected by an amplifier 33. This difference frequency is $f5-f2$; and excludes any effect of $\Delta f$, regardless of the value of the latter. Since $f5$ and $f2$ both derive from crystal oscillators the frequency selected by amplifier 33 remains fixed. Amplitude information pertaining to the response of circuit 23 is included in one of the inputs to mixer 32 and hence appears in its output.

The output of amplifier 33 is detected in detector 34, amplified in video amplifier 35, and applied to vertical deflection electrodes 36 of cathode ray tube indicator 37. The output of sweep generator 11 is applied to horizontal deflection electrodes 38.

Accordingly, a horizontal frequency base line is generated on the face of CRT 37, proportional to $\Delta f$ at each instant of time, while a scanning frequency $f1-f4+\Delta f$ is applied to circuit under test 23. The latter frequency derives from a crystal oscillator 21, and from a stabilized sweep oscillator 12. The response of the circuit under test is then converted always to a single frequency equal to the frequency difference of two signals derived from crystal controlled oscillators. Whenever a test signal is passed by the circuit under test, the difference frequency appears, and generates a display on the CRT 37. If the test signal is not passed, no difference frequency appears. Since the difference frequency is invariant, or does not depend on the frequency of the test signal, it may be amplified in a narrow band high gain amplifier, prior to application to the visual display, without danger of the characteristics of the amplifier affecting the character of the display or its amplitude. Since the amplifier is narrow band the gain may be high, without noise, and since the amplifier responds to a difference frequency the system may readily be desgined to employ a low frequency, highly stable amplifier at a convenient pass frequency.

What I claim is:

1. In a frequency test system for a system under test, a source of scanning frequency, $f1+\Delta f$, wherein $f1$ is a fixed frequency and $\Delta f$ a frequency deviation variable with time, a first mixer, a second mixer, a first fixed frequency oscillator of frequency $f4$, a second fixed frequency oscillator of frequency $f5$, means for applying said frequencies $f4$ and $f1+\Delta f$ to said first mixer and deriving therefrom a test frequency $f1-f4+\Delta f$, means for applying said frequencies $f4$ and $f5$ to said second mixer and deriving therefrom a fixed frequency $f5-f4$, means applying said test frequency to said system under test and deriving a response therefrom at frequency $f1-f4+\Delta f$, a third mixer, means deriving a difference frequency from said third mixer equal to $f1-f5+\Delta f$ responsive to said response and to said frequency $f5-f4$, means deriving a frequency $f1-f2+\Delta f$ from said source of scanning frequency, where $f2$ is a fixed frequency, and a further mixer responsive to said frequencies $f1-f2+\Delta f$ and $f1-f5+\Delta f$ to derive a fixed frequency $f5-f2$.

2. In a system for testing the frequency response characteristic of a system under test, means for generating a frequency scanning test signal ranging over the response frequencies of said system under test, means for applying said test signal to said system under test and deriving therefrom a reponse signal of frequency equal to said test signal but of amplitude modified by said response characteristic, and heterodyne means responsive to said response signal for generating an invariable frequency signal for all frequencies of said frequency scanning test signal, said heterodyne means including a pair of frequency stabilized oscillators, said invariable frequency signal being responsive to said oscillators and equal in frequency to the difference of the frequencies of said oscillators.

3. In combination, in a system for testing the frequency versus amplitude response of a system under test:

a source of frequency $f1+\Delta f$, where $\Delta f$ is a variation of the frequency $f1$, means responsive to the frequency $f1+\Delta f$, to form the frequency $f1-f2+\Delta f$, where $f2$ is a fixed frequency, means for generating the fixed frequency $f4$, first crystal oscillator means for generating the fixed frequency $f5$, second crystal oscillator means responsive to said fixed frequency $f4$ and said frequency $f1+\Delta f$ to form the test frequency $f1-f4+\Delta f$, means for applying said test frequency to said system under test and for deriving the response thereof, means for deriving the difference frequency $f5-f4$ in response to said first and second crystal oscillator means, means responsive to said difference frequency and to said response for generating a further difference signal of frequency $f1-f5+f1$, and means responsive to said further difference signal and said frequency $f1-f2+\Delta f$ to form the fixed response frequency $f5-f2$ regardless of the value of $\Delta f$ but bearing information pertaining to the amplitude of said response.

4. A system for testing the frequency response characteristic of an electrical system, including:

means including a first crystal controlled oscillator for generating a frequency scanned first signal, means applying said first signal as an input signal to said electrical system, means deriving a response signal from said electrical system containing the frequency scan of said first signal, means including a second crystal controlled oscillator for generating a frequency scanned second signal having the frequency scans of said first signal and having a means frequency differing by a fixed frequency from the means frequency of said first signal, mixer means responsive to said response signal and to said second signal for deriving a further response signal equal in frequency to the said fixed frequency, and means for plotting the amplitude of said further response signal against the frequency of said frequency scanned first signal.

5. The combination according to claim 4 wherein said fixed frequency is equal to the difference of the frequencies of said crystal controlled oscillators.

6. In a system for testing the frequency response characteristic of a system under test:

means for generating a frequency scanning test signal ranging over the response frequencies of said system under test, means for applying said test signal to said system under test and deriving therefrom a response signal of frequency equal to said test signal but of amplitude modified by said response characteristic, heterodyne means responsive to said response signal for generating an invariable frequency signal for all frequencies of said frequency scanning test signal, said heterodyne means including a pair of frequency stabilized oscillators, said invariable frequency signal being responsive to said oscillators and equal in frequency to the difference of the frequencies of said oscillators, a cathode ray oscilloscope, and means including said cathode ray oscilloscope for plotting the amplitude of said invariable frequency signal against the frequency of said frequency scanning test signal.

7. In a frequency test system for a system under test:

a source of scanning frequency $f1+\Delta f$, wherein $f1$ is a fixed frequency and $\Delta f$ is a frequency deviation variable with time, a first mixer, a first fixed frequency oscillator of frequency $f4$, a second fixed frequency oscillator of frequency $f5$, means for applying said frequencies $f4$ and $f1+\Delta f$ to said first mixer and deriving therefrom a test frequency $f1-f4+\Delta f$, means for applying said frequencies $f4$ and $f5$ to said second mixer and deriving therefrom a fixed frequency $f5-f4$, means applying said test frequency to said system under test and deriving a response therefrom at frequency $f1-f4+\Delta f$, a third mixer, means deriving a difference frequency from said third mixer equal to $f1-f5+\Delta f$ responsive to said response and to said frequency $f5-f4$, means deriving a frequency $f1-f2+\Delta f$ from said source of scanning frequency, where $f2$ is a fixed frequency, a further mixer responsive to said frequencies $f1-f2+\Delta f$ and $f1-f5+\Delta f$ to derive a fixed frequency $f5-f2$, a cathode ray oscilloscope, and means including said cathode ray oscilloscope for plotting the amplitude of the signal of fixed frequency $f5-f2$ versus the frequency of the source of scanning frequency $f1+\Delta f$.

8. In a system for plotting the amplitude versus frequency response of a system under test;

a first relatively low frequency oscillator,
a second relatively high frequency oscillator,
a mixer responsive to the outputs of said oscillators,
a frequency discriminator responsive to the output of said mixer, said discriminator being arranged to have zero output when the frequencies of said oscillators have a predetermined frequency difference relation,
means for varying the frequency of said first oscillator,
means responsive to the output of said discriminator for varying the frequency of said second oscillator so as to maintain said frequency difference relation,
a visual plotter for plotting in two coordinate directions,
means applying the output of said relatively high frequency oscillator to said system under test as an input signal and for deriving the response of said system under test to said input signal, and
means including said visual plotter for plotting said response versus the frequency of said relatively low frequency oscillator.

9. In a system for testing the frequency response characteristic of a system under test;
means for generating a frequency scanning test signal,
means applying said frequency scanning test signal as an input to said system under test and for deriving a response signal,
said means for generating a frequency scanning test signal including a first fixed frequency crystal controlled oscillator providing a fixed frequency component of said test signal,
means for generating a further frequency scanning signal,
said last means including a second fixed frequency crystal controlled oscillator displaced by a difference frequency from the frequency of said first fixed frequency crystal controlled oscillator and providing a fixed frequency component of said further frequency scanning signal, and
means responsive to said response signal and to said further frequency scanning signal for deriving an output signal having always the frequency of said difference frequency despite said frequency scanning.

References Cited

UNITED STATES PATENTS

| | | | |
|---|---|---|---|
| 2,452,960 | 11/1948 | Smith | 324—79 |
| 2,530,596 | 11/1950 | Blok | 324—57 |
| 2,632,792 | 3/1953 | Selz | 324—57 |
| 2,714,657 | 8/1955 | Stein | 324—57 X |
| 2,760,155 | 8/1956 | Kelly | 324—57 |
| 2,882,394 | 4/1959 | Mortley | 324—79 |
| 3,119,062 | 1/1964 | Codd | 324—57 |
| 3,227,949 | 1/1966 | Oberbeck | 324—57 |
| 2,972,108 | 2/1961 | Stone | 324—77 |

RUDOLPH V. ROLINEC, *Primary Examiner.*

P. F. WILLE, *Assistant Examiner.*

U.S. Cl. X.R.

324—79